United States Patent [19]
Petersen et al.

[11] Patent Number: 4,837,474
[45] Date of Patent: Jun. 6, 1989

[54] D.C. MOTOR

[75] Inventors: Christian C. Petersen; Ken G. Wasson, both of Fremont, Calif.

[73] Assignee: Camatec Corporation, Fremont, Calif.

[21] Appl. No.: 231,763

[22] Filed: Aug. 12, 1988

[51] Int. Cl.$^4$ ............................................. H02K 1/12
[52] U.S. Cl. ................................. 310/254; 310/156; 310/185; 310/194; 310/268
[58] Field of Search ............... 310/156, 179, 180, 185, 310/194, 254, 268

[56] References Cited

U.S. PATENT DOCUMENTS

| | | | |
|---|---|---|---|
| 3,124,733 | 3/1964 | Andrews | 318/138 |
| 3,599,050 | 4/1969 | Momatsu | 318/138 |
| 3,922,574 | 11/1975 | Whiteley | 310/268 |
| 4,072,881 | 2/1978 | Ban | 318/138 |
| 4,174,484 | 11/1979 | Schmider | 310/68 |
| 4,488,075 | 12/1984 | DeCesare | 310/156 |
| 4,508,998 | 4/1985 | Hahn | 318/138 |
| 4,571,528 | 2/1986 | McGee et al. | 318/138 |
| 4,626,727 | 12/1986 | Janson | 310/156 |
| 4,633,149 | 12/1986 | Welterlin | 318/254 |
| 4,668,884 | 5/1987 | Amao et al. | 310/68 |
| 4,731,554 | 3/1988 | Hall et al. | 310/67 |
| 4,745,345 | 5/1988 | Petersen | 318/254 |
| 4,763,050 | 8/1988 | Ruppert | 318/254 |

Primary Examiner—Patrick R. Salce
Assistant Examiner—Anita M. Ault
Attorney, Agent, or Firm—Mueller and Smith

[57] ABSTRACT

A P.M. d.c. motor in which the permanent magnets thereof are provided as arcuate segments of predetermined length which rotate about a circular locus of core component defining pole assemblies. The paired permanent magnets are magnetized in a radial polar sense and interact in radial fashion with three core components of each pole assembly which include a centrally disposed core component extending within a channel between the magnet pairs and to adjacent inwardly and outwardly disposed core components also interacting with the permanent magnet radially disposed surfaces. With the arrangement, localized rotor balancing is achieved and, additionally, discrete or localized magnetic circuits are developed with respect to the association of each permanent magnet pair with a pole assembly.

21 Claims, 4 Drawing Sheets

D.C. MOTOR

BACKGROUND OF THE INVENTION

Investigators involved in modern electronic and electromechanical industries increasingly have sought more refined and efficient devices and techniques in the generation of motion and the effectuation of its control. For example, the mass storage of data for popularly sized computers is carried out by recordation on magnetic disks which are rotatably driven under exacting specifications. The data handling performance of such memory handling systems relies to a considerable degree upon the quality and reliability of the rotational drive components associated with them.

Permanent magnet (P.M.) direct current (d.c.) motors generally have been elected by designers as the more appropriate device for refined motion generation or drive. Clasically, the P.M. d.c. motor is a three-phase device having a stator functioning to mount two or more permanent magnet poles which perform in conjunction with three or more rotor mounted field windings. These windings are positioned over the inward portions of pole structures typically formed of laminated steel sheets. The ends or tip portions of the rotor poles conventionally are flared or curved somewhat broadly to improve their magnetic interaction with the stator magnet. Field windings are intercoupled with either a delta or a Y circuit configuration and by exciting them in a particular sequence, an electromagnetic field, in effect, is caused to move from one pole tip to the next to achieve an interaction with the permanent magnet fields and thereby evolve rotatonal motion. This interaction occurs typically through an air gap which is generally in parallel relationship with or concentric to the axis of the rotor while flux transfer occurs across the gap radially. The interaction between the permanent magnet field and field of the excited windings is one wherein tangential force vectors are developed in consequence of an association of the exciting field with the field or flux of the permanent magnet. Clasically, the switching providing select excitation of the field windings is provided by a commutator rotating with the rotor and associated with brushes representing a make and break mechanical switching device functioning to move the field along the pole tips.

With the advent of more sophisticated electronic systems such as disk memory data storage assembly of computers, the classic P.M. d.c. motor has been found to be deficient in many aspects. For example, the make and break commutation of historic designs is electrically noisy and somewhat unreliable, conditions which are unacceptable for such applications. Such motors are relatively large, and this aspect contributes to undesired design requirements for bulk, the designer losing much of the desired flexibility for innovation in applications requiring motor drive. Further, the manufacturer of such motors must cope with the somewhat complex nature of typical rotor pole structures carrying field windings. For example, the production of the windings upon individual poles involves a procedure wherein wire is maneuvered beneath the flared tips of a fully assembled rotor structure.

To address the performance limitations of electrical noise caused by brush-type motors, brushless P.M. d.c. motors have been developed wherein field commutation otherwise carried out mechanically has been replaced with an electronic circuit. These motors generally provide a higher quality performance including much quieter electrical operation. A radial gap architecture is retained from earlier designs. As in earlier designs, the field windings are provided beneath flared pole tips but the flared pole tips are on the inside of the stator surface facing towards the central permanent magnet rotor poles and as such create a more difficult winding operation for the production of such motors. Typically, the permanent magnet components of such quieter electrical systems move as opposed to the field windings of the motor.

Where d.c. motors are configured having steel core poles and associated field windings performing in conjunction with rotor mounted permanent magnets, there occurs a somewhat inherent development of detent torque. At rest, or in a static state, the steel poles of a typical rotor will assume an orientation with respect to associated permanent magnets which develop flux paths of least potential energy which corresponds to positions of highest flux density and least reluctance. Thus, were one to hand rotate the rotor of an unenergized motor of such design, these positions of rest or detent positions can be felt or tactily detected as well as the magnetic field induced retardation and acceleration developed in the vicinity of the detent positions. During an ensuing excitation state of the motor windings creating rotational drive, detent torque will be additively and subtractively superimposed upon the operational characteristics of the motor output to distort the energized torque curve, increase ripple torque, often reduce the minimum torque available for starting, and, possibly, develop instantaneous speed variations (ISV) which generally is uncorrectable, for example, by electronics. ISV characteristics also can be generated from mechanical unbalance phenomena in the rotor of the motor itself or the bearings thereof if they are a part of the rotated mass. Generally, detent torque contributions to ISV and other phenomena are observable in the operational characteristic or torque curve of motors, for example being manifested as a form of ripple torque. In the past, the dynamic output of the motors has been smoothed through resort to rotational mass such as flywheels and the like. However, for great numbers of modern applications, design constraints preclude such correction and motors exhibiting large ISV characteristics are found to be unacceptable. As a consequence, spindle motors for disk drives of computer systems, for example, have been configured as vector cross products or B cross I devices, sometimes known as voice coil motors, which do not employ steel pole structures in the air gap.

Petersen, in U.S. Pat. No. 4,745,345 entitled "D.C. Motor with Axially Disposed Working Flux Gap" issued May 17, 1988, describes a P.M. d.c. motor of a brushless variety employing a rotor-stator pole architecture wherein the working flux gap is disposed "axially" (to the motor axis) and wherein the transfer of flux is generally parallel to the axis of rotation of the motor. This "axial" architecture further employs the use of field windings which are simply structured being supported from stator pole core members which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable geometric configurations.

Detent torque characteristics which otherwise might occur with such motor designs are accommodated for by adjusting the geometric design of the permanent magnets within the rotor structure as well as, for example, by developing a skew orientation of the stator core poles. The latter skewing approach, however, necessarily is avoided where the noted design requirements for diametric miniaturization are encountered. Because of the static permanent magnet induced axial forces necessarily present with such motor structures, accommodation also may be necessary for such forces as well as for any time varying force term generated in consequence of commutation of the motors. Without such accommodation, for example, audible noise may be generated which for some applications will be found undesirable.

Petersen, in application for U.S. patent, Ser. No. 220,235 filed July 18, 1988, and assigned in common herewith describes a d.c. motor with an axial architecture wherein the noted permanent magnet induced axial forces are substantially eliminated through the employment of the axially polarized rotor magnets in a shear form of flux transfer relationship with the steel core components of stator pole positions. The dynamic tangentially directed vector force output (torque) of the resultant motor is highly regular or smooth lending such motor designs to numerous technological applications requiring both design flexibility, volumetric efficiency, low audible noise and a very smooth torque output.

A particularly desirable characteristic of the architecture wherein rotor magnets are associated with core components in a shear orientation resides in the provision of a localized balancing of the magnetic forces of attraction between the rotor and stator components. In classic motor designs, this balance is achieved in a diametric sense, a magnetic attraction at one side of the circumference of the rotor balancing that developed at the other side. With the axial shear motor approach, each magnetic interaction is locally balanced to provide refined rotor motion characteristics. Increasingly, the designers of products which necessarily incorporate D.C. p.m. motors are seeking smaller and smaller envelopes within which to incorporate given operational functions. As a consequence, motor structures are required which are of smaller size, yet which must achieve concomitantly higher volumetric efficiencies to maintain requisite torque outputs, i.e. torque per unit volume, high value acceleration characteristics and the like. Very often, the restricted space available to a motor function additionally is of irregular shape. Thus, the operational functions of the motors such as requisite magnetic flux return patterns, pole windings, associated stator core component designs, and the like are required to exhibit a packaging flexibility without unduly sacrificing motor performance requirements.

SUMMARY

The present invention is addressed to a P.M. d.c. motor of a variety in which rotor mounted permanent magnet components are magnetized in a radial sense and are associated with discrete stator-mounted pole assemblies to exhibit both localized magnetic circuits for developing rotational drive and localized magnetic rotor balance. These attributes promote high torque and good magnetic coupling characteristics as well as enhanced acceleration capabilities. Of particular value, the operational features of the motor lend it to implementation within a broad range of designs, including those necessitating the development of efficiency in terms of torque realized per unit volume. The employment of the magnetically permeable materials in any given structure of the motor may advantageously be minimized. Thus, the salient design features of the motor are available to meet increasingly rigorously limited packaging requirements of using industries.

Another feature of the invention is the provision of a d.c. motor which includes an arrangement for providing a stator base having a given central axis as well as a rotor mounted upon the stator base for rotation about that central axis. A predetermined number of permanent magnet components are located upon the rotor for movement therewith about a circular rotor locus, each being magnetized having a select polarization aligned radially with respect to the central axis and emanating magnetic flux from oppositely disposed substantially parallel flux transfer surfaces. A plurality of pole assemblies are located upon the stator base along a circular locus of pole positions, each pole assembly including first and second spaced, substantially parallel core components mutually associated in magnetic flux transfer communication, each extending from the base to include a flux interaction surface extending into adjacency with the permanent magnet rotor locus to derive oppositely disposed flux transfer gaps with the flux transfer surfaces upon movement of the flux transfer surfaces into adjacency therewith forming a complete, localized magnetic circuit including the first and second core components. Field windings are positioned intermediate the base and a flux interaction surface and are selectively excitable to effect driven rotation of the rotor about the central axis.

Another feature of the invention is the provision of a d.c. motor including an arrangement providing a stator base having a given central axis as well as a rotor mounted upon the stator base for rotation about that central axis. A predetermined number of permanent magnet components, each including an elongate pair of arcuate shaped permanent magnets extending from the rotor and spaced apart to define an arcuate channel therebetween are provided. These permanent magnets of each component are magnetized to exhibit polarizations aligned substantially radially with respect to the axis and to provide mutually inwardly facing flux transfer surfaces having a first polarity and radially oppositely disposed first and second flux transfer surfaces of second polarity opposite to the first polarity. A plurality of pole assemblies are located upon the stator base along a circular locus of pole positions, each pole assembly having three substantially parallel and mutually spaced core components including a central core component magnetically associated in flux transfer communication with the first and second adjacent core components, the central core component extending from the base to provide oppositely disposed flux interaction surfaces extensible within the arcuate channel to derive oppositely disposed first and second flux transfer gaps with the mutually inwardly facing flux transfer surfaces. The first and second core components extend from the base to provide respective first and second flux interaction surfaces extensible into adjacency with respective first and second radially oppositely disposed flux transfer surfaces to derive respective third and fourth flux transfer gaps. A field winding arrangement is positioned intermediate the base and the flux interaction surfaces and is selectively excitable to effect driven rotation of the rotor about the central axis.

Other objects of the invention will, in part, be obvious and will, in part, appear hereinafter.

The invention, accordingly, comprises the apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

DETAILED DESCRIPTION OF THE INVENTION

The D.C. motor of the invention is one designed for providing an improved level of dynamic performance while being fabricable not only under high volume production methods but also within a wide range of geometric formats including miniaturized versions. The magnetic circuit by which tangential vector or rotational drive torque is developed is composed of two components which interact with each other, one being the magnetic circuit developed from rotor mounted permanent magnets and the other being the ampere-turn magnetic circuit developed from field windings. These circuits are completed in a uniquely localized manner, for example as small modules as opposed to conventional magnetic circuits which extend in various configurations peripherally about the motor.

Figure 1:
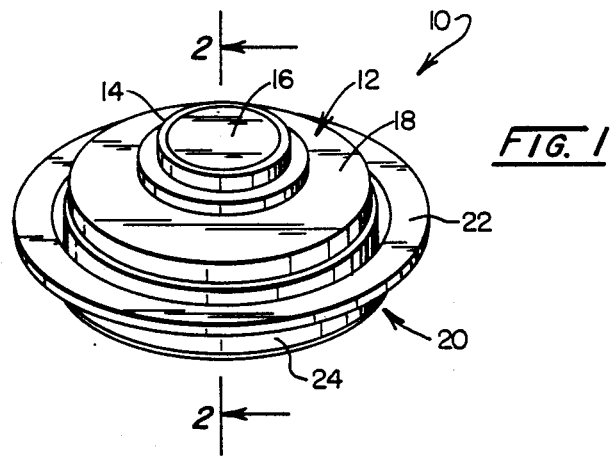
FIG. 1 is a pictorial representation of a d.c. p.m. motor according to the invention.
Figure 2:
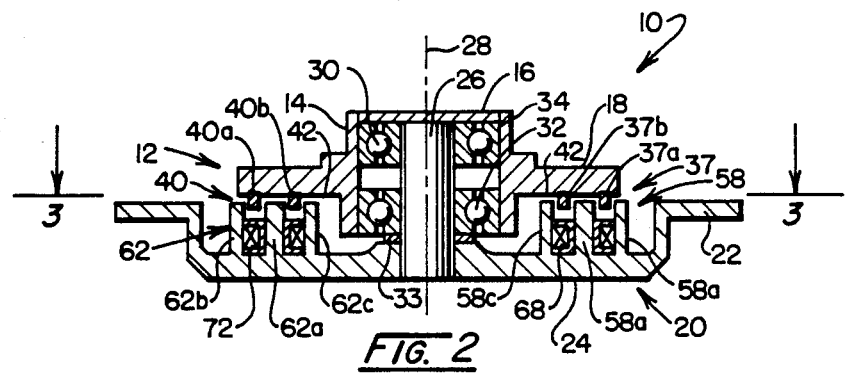
FIG. 2 is a sectional view of the motor of FIG. 1 taken through the plane 2—2 thereof.

Referring to FIG. 1, a D.C. p.m. motor is represented in pictorial fashion in general at 10. Motor 10 is structured for application as a disk drive spindle motor which is seen to incorporate a rotor represented generally at 12. Rotor 12 is configured having a shaft and bearing retaining region shown as a cylindrical extension 14 incorporating a sealing cap 16. Rotor 12 then extends outwardly to provide a cylindrical or disk-shaped support structure 18. The stator for motor 10 is represented in general at 20 and includes a mounting flange 22 and a stator base portion 24. Stator base portion 24 may be configured in a stand-alone configuration as represented (FIG. 7) or, alternately, may be configured within the support structure of the functional assemblage within which the motor 10 performs (FIG. 2). Note, however, that the base 24 supports a cylindrical shaft 26 which, in turn, is positioned coaxially with the central axis 28 of the motor 10. Shaft 26, in turn, functions to support the rotor 12 via a bearing connection including bearings 30 and 32 journaled for rotation about shaft 26 and fitted against a rotor contained central bore 34. A spacer washer 33 positions the rotor 12 vertically upon shaft 26.

Supported by and extending from the underside of support structure 18 of rotor 12 are a series of permanent magnet components. Looking additionally to FIG. 3, these components are seen represented at 36–41 as being formed of paired arcuate magnets located at outer and inner radii from axis 28 as represented by the respective suffixes "a" and "b". FIG. 2 shows that these paired permanent magnets of each of the permanent magnet components extend downwardly from the lower disposed surface 42 of rotor 12 portion 18. As such, they define an arcuate channel therebetween identified generally at 44 in FIG. 3 as it extends intermediate permanent magnets 36a and 36b of permanent magnet component 36. Channel 44 is seen to be defined between each of the successive permanent magnet components 36–41. In addition to being of arcuate shape, the permanent magnets 36a–41a and 36b–41b are magnetized to exhibit polarization as aligned substantially radially with respect to axis 28. Generally, the magnets are mounted adhesively within slight arcuate channels formed within surface 42 and are magnetized in the noted radial sense. Looking additionally to FIG. 4, such a radial magnetization, for example for permanent magnet 40a is revealed. Magnet 40a, for example, is so magnetized as to provide a flux transfer surface 46a which is radially inwardly directed and may, for example, represent a north designated polarity. The opposite surface 48a of magnet 40a is shown in FIG. 4 to have a south designated polarity and magnetization of the permanent magnet is carried out such that essentially no flux transfer occurs in a direction parallel with the axis 28 as would be developed, for example, at surfaces 50a and 5b. For this type of magnetization, leakage flux is represented extending between radially oppositely disposed surfaces 46a and 48a as represented by the arrows labelled "LF". Such directional magnetization generally is provided by powder metallurgical technology wherein the magnet-particles from which the magnets are formed are electromagnetically oriented then pressurized into the arcuate form shown so as to avoid a random orientation. Subsequent to pressurized formation of the particulate constituted magnets, they are magnetized to develop the polarization desired, here in the noted radial direction. The labelled leakage (LK) phenomena can be minimized by enhancing the widthwise dimension between the flux transfer surfaces of the magnet structures depending upon the topological constraints otherwise imposed.

Figure 3:
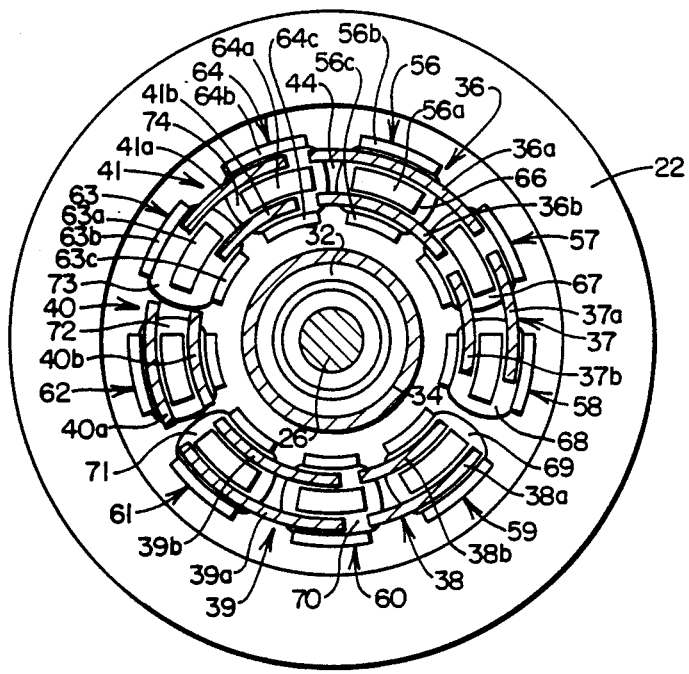
FIG. 3 is a sectional view of the motor of FIG. 2 taken through the plane 3—3 thereof.
Figure 4:
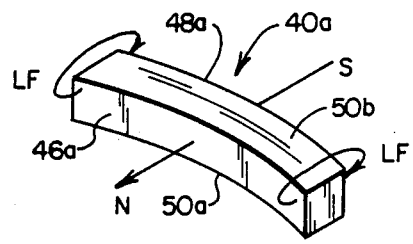
FIG. 4 is a pictorial representation of a permanent magnet which may be employed with the motor of FIG. 1.

FIG. 2 further reveals two pole assemblies 58 and 62 of a sequence of nine of such assemblies shown at 56–64 in FIG. 3. For the instant embodiment, these assemblies 56-64 are formed integrally with the base portion 24 of stator 20. Each of the pole assemblies 56-64 includes a central core component represented by a suffix "a", a radially outwardly-disposed adjacent core component identified by the suffix "b" and in a radially inwardly disposed adjacent core component identified by the suffix "c". In this regard, FIG. 2 reveals a pole assembly 58 with central core components 58a, radially outwardly adjacent core component 58b and radially inwardly adjacent component 58c. Generally oppositely disposed from the assembly 58 is assembly 62 having a central core component 62a, a radially outwardly disposed core component 62b and a radially inwardly disposed component 62c. The central components as at 62a are magnetically associated in flux transfer communication with each of the adjacent components as at 62b and 62c. This communication for the instant embodiment is one achieved inasmuch as the base portion 24 as well as each core component are integrally formed of a magnetically permeable material.

FIG. 3 further reveals that pole assemblies 56-64 are uniformly spaced about the locus of travel of the permanent magnet components 36-41 and, in particular, the central core components 56a-64a extend upwardly into the earlier identified arcuate channel 44 formed by the spaced permanent magnet components. Thus, the mutually inwardly facing flux transfer surfaces of the permanent magnets 36a,b-41a,b confront corresponding upwardly disposed flux interaction surfaces of these central core components. Note, particularly, that the central core components are confronted with flux directed from adjacent permanent magnets from each side such that two oppositely disposed flux interaction surfaces are provided with each such central core component. FIGS. 2 and 3 further reveal that the radially outwardly disposed adjacent core components 56b-64b as well as the radially inwardly disposed adjacent core components 56c-64c also extend into adjacency with the respective inwardly and outwardly disposed flux transfer surfaces of the respective permanent magnets 36a-41a and 36b-41b. To achieve rotational drive, each of the pole assemblies 56-64 additionally is configured having a field winding shown, respectively, at 66-74. For the instant embodiment, these field windings are mounted upon an electrically insulative bobbin which in the course of fabrication is slideably positioned over the centrally disposed pole components 56a-64a.

FIG. 3 further reveals that the permanent magnet components 36a,b-41a,b are of arcuate shape and define arc segments with respect to the central axis 28 (FIG. 2). These are segments selectively arranged to exhibit lengthwise dimensions of the magnets selected with respect to the regularly spaced pole assemblies 56-64 such that the static state attraction and repulsion induced detent torque characteristics between these permanent magnets and the pole assemblies are substantially reduced. In this regard, for the instant embodiment wherein nine pole assemblies are provided, six arc segments for the permanent magnets are developed such that permanent magnets 36 encompass an arc of 60°; permanent magnets 37 encompass an arc of about 40° and are spaced about 7.7° from magnet 36; permanent magnets 41 also encompass an arc segment of about 40° and similarly are spaced about 7.7° of arc from permanent magnets 36.

In similar fashion, essentially oppositely disposed permanent magnets 39 encompass an arc of about 60° and adjacent permanent magnets 38 encompass an arc segment of about 40° with a spacing from magnets 39 by an arc segment of about 7.7°. Finally, permanent magnets 40 encompass an arc segment of about 40° and, similarly, are spaced from permanent magnets 39 by an arc of about 7.7°. The above-noted spacing has been developed empirically in accordance with the teachings of the above-noted U.S. Pat. No. 4,745,345 by Petersen, issued May 17, 1988, which is incorporated herein by reference.

Figure 5:
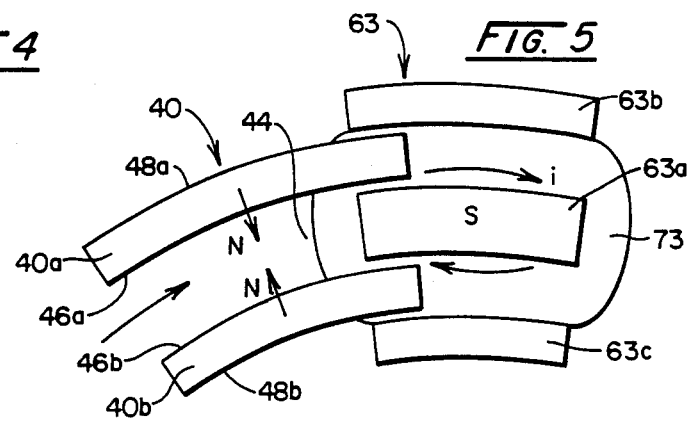
FIG. 5 is a schematic representation of a relative orientation of permanent magnets and pole assemblies of the motor of FIG. 1 during a portion of rotor driven movement.

The permanent magnet pairs 36-41, in addition to being magnetized to exhibit polarizations aligned substantially radially with respect to the axis 28 (FIG. 2) additionally are arranged such that their flux transfer surfaces as described at 46a and 48a in conjunction with FIG. 4 are positioned such that the mutually inwardly facing flux transfer surfaces have the same polarity. Accordingly, the corresponding outwardly disposed flux transfer surfaces will exhibit the same polarity. FIG. 5 is a schematic portrayal of that arrangement and in addition portrays the movement of permanent magnet pair 40a and 40b into drive developing adjacency with pole assembly 63 is revealed. The inwardly-disposed flux transfer surfaces 46a and 46a are seen to carry a north polar designation and the field winding 73 about central core component 63a is shown excited as represented by the right-hand rule with a current, i, to develop a south polar state effecting an appropriate torque inducing attraction with the flux transfer surfaces 46a and 46a. In corresponding fashion the outboard core components 63b and 63c develop a north polar designation effecting an attraction with corresponding flux transfer surfaces 48a and 48b of the respective permanent magnets 40a and 40b. In conventional fashion, as the magnet assembly 40a, 40b passes across the the core assembly 63, the current within winding 73 is reversed to effect a torque generating repulsion. Of particular note, the magnetic structure so provided is one wherein there are substantially no radially induced vectors of force in that the magnetic-electromagnetic circuit structuring is one which is locally balanced. In more conventional d.c. motor designs, rotor electromagnetic radial force balancing occurs by the development of opposing magnetically induced radially directed force vector interactions generally at equal vector angle points over the entire rotor. This requires that the radial air gap between the rotor and stator be constant over the entire rotational surfaces plus the rotor magnet elements be uniformly magnetized. The instant localized balance of rotor 12 again enhances the design flexibility of the devices.

Figure 6:
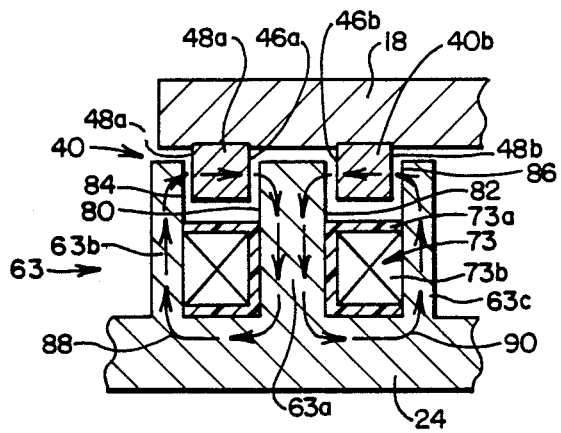
FIG. 6 is a partial sectional view of a pole assembly and permanent magnet association of the motor of FIG. 1.

In addition to the above-noted localized balancing carried out by the magnetic circuits associated between the permanent magnet components and core assemblies, there additionally exists a localized magnetic circuit. In FIG. 6, exemplary arcuately shaped permanent magnets 40a and 40b are shown in section in conjunction with the rotor 12 support structure 18. The magnetic circuit arrangement evolved by field winding excitation as described in the example associated with FIG. 5 again is portrayed. In this regard, pole assembly 63 is revealed incorporating central core component 63a and adjacent outward and inwardly disposed core components as shown, respectively, at 63b and 63c. Field winding assembly 73 is represented including an electrically insulative bobbin 73a and winding 73b. Central core component 63a is seen to extend above the field winding 73 to provide oppositely disposed flux interaction surfaces 80 and 82. In similar fashion, core component 63b extends above the field winding 73 to provide a flux interaction surface 84 and core component 63c provides a corresponding flux interaction surface 86. This arrangement achieves the development of two localized magnetic circuits as represented by the arrow trains 88 and 90. Upon the energization of field winding 73, the static or permanent magnet induced magnetic circuit is caused to interact with the electromagnetically induced field to provide a generally tangential force when a torque producing relationship such as shown in FIG. 5. It may be observed that the magnetic flux transfer does not extend across or along the periphery of the rotor component 18 nor does it extend beyond this localized pole assembly region within the base 24. Such an arrangement, as before, substantially enhances the design flexibility of the motor. An advantageous aspect of the localized magnetic circuit resides in the elimination of a need for "back iron" structuring of the rotor component 18. Because this component is not involved in the magnetic circuit, the rotor support structure 18 may be constructed of materials which are non-magnetically permeable. Thus low mass materials may be selected to achieve enhanced start-up acceleration characteristics and the like.

The magnetic circuit embodiment shown in FIG. 6 also is the occasion of a design consideration for the thickness of central core component 63a. Because two distinct magnetic circuits traverse this component, accommodation must be made for its saturation cross section or the B-saturation value of the material from which the component is fabricated. For example, standard lamination steels have a magnetic flux density limiting capability of about 20,000 gauss and, for the case of powdered metal materials employed for these components the value may be as low as 14,000 or 15,000 gauss. For the arrangement of FIG. 6, it may be noted that the cross-sectional area of this core component 63a is about twice that of the adjacent outboard components 63b and 63c to accommodate for the dual magnetic circuit paths involved as described at 88 and 90.

As an aspect of the design flexibility made available by localized magnetic circuits characteristic of the motor of the present invention, the pole assemblies as described at 56-64 may be made in modular form. Thus, the moment arm characteristics of the motor as developed by the spacing of the assemblies from the central axis of the motor may be varied to suit design needs. Looking to FIG. 7, such a modular arrangement is represented in the sectional view of motor 100 which is substantially similar to motor 10 as described in conjunction with the figures. Motor 100 is seen to include a rotor 102 having an upwardly disposed cylindrical extension 104 having a cap 106 which extends over an internal bearing support region 108 which is internally bored to provide a cylindrical internally disposed surface 110. As before, the rotor 102 includes a support structure 112 which serves to support permanent magnet assemblies as before, two pairs of which are revealed at 114a, 114b, and 116a, 116b.

Figure 8A:
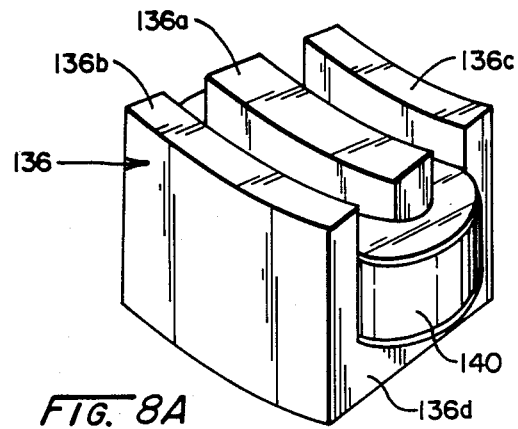
FIG. 8A is a pictorial representation of a modular pole assembly employed with the motor embodiment of FIG. 7.

The stator of motor 100 is represented in general at 120 having a base portion 122 which supports an upstanding shaft 124 in coaxial alignment with the central axis of the motor as represented at 126. Shaft 124 functions to support the rotor 102 via a pair of bearings 128 and 130, the outer races of which are secured to the rotor 102 at internal surface 110. A spacer washer 132 functions to establish the vertical position of rotor 102. Base 122 of the stator 120 is seen to additionally incorporate outwardly depending annular shaped mounting flange 134 and further supports a predetermined number of modular pole assemblies, two of which are revealed at 136 and 138. Looking momentarily to FIG. 8, the modular pole assembly 136 is seen in pictorial fashion to include a centrally disposed core component 136a as well as outwardly disposed core component 136b and radially inwardly disposed core component 136c. These components are integrally formed with a base portion 136d which is mounted within an annular groove 144 of rectangular cross-section formed within base portion 122. The assembly also may be formed of steel laminations. Such a structuring is shown in FIG. 8A with the same identifying numeration as employed in FIG. 8 but in primed fashion.

Pole assembly 138 is seen to be structured in identical fashion, having a centrally disposed core component 138a, outwardly disposed adjacent core component 138b and radially, inwardly disposed adjacent core component 138c. These components are supported from an integrally formed base portion 138d. Field winding assembly 142 is shown positioned over central core component 138a. With the arrangement shown, the materials by which the motor 100 is structured may be selected from a broad variety of choices including those which are non-magnetically permeable and of relatively lowdensity and high thermal conductivity. In this regard, the rotor support structure 112 may be formed of such material as well as the base portion 122 of the stator 120.

Figure 7:
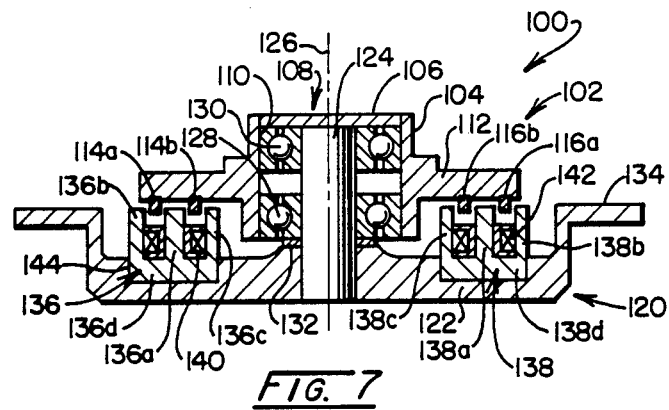
FIG. 7 is a sectional view of another embodiment of the motor according to the invention incorporating modular pole assemblies.
Figure 8B:
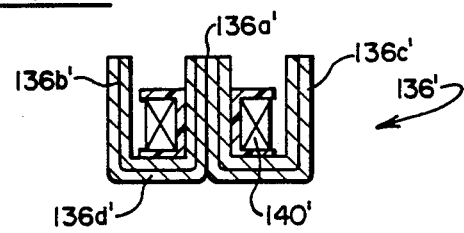
FIG. 8B is a sectional view of the assembly of FIG. 8 but showing a steel lamination structure therefor.

Also, the stator module 138 may be formed out of a magnetically permeable sintered material or an arrangement of steel laminations (See FIGS. 7 and 8).

Figure 9:
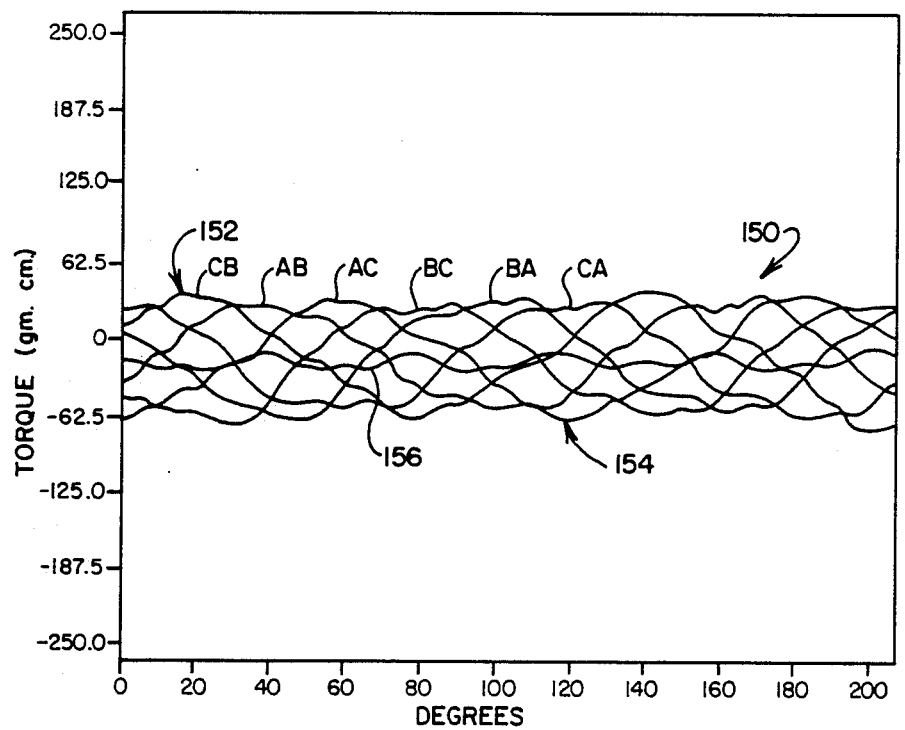
FIG. 9 shows a family of torque curves derived from operation of a motor constructed in accordance with the teachings of the invention.

A motor constructed as described at 10 in conjunction with FIGS. 1-6 and incorporating relatively minimal amounts of permanent magnet material has been tested through an arrangement providing a "Y" circuit structuring of the field windings therein. Three of the nine field windings 66-74 were assigned to a phase A, another three to a phase B and a third three to a phase C and motor excitation was carried out in conventional fashion. FIG. 9 reveals the resultant static torque energization curve. The resultant torque output curves are represented generally in the figure at 150, such curves being presented by the phase excitation sequences CB, AB, AC, BC, BA, CA, etc. Note that the upper region 152 of the output torque curves show excellent and relatively smooth performance as well as do the lower regions of the curve at 154. The detent torque curve for the particular test is represented at 156 showing a very low detent torque characteristic.

Figure 10:
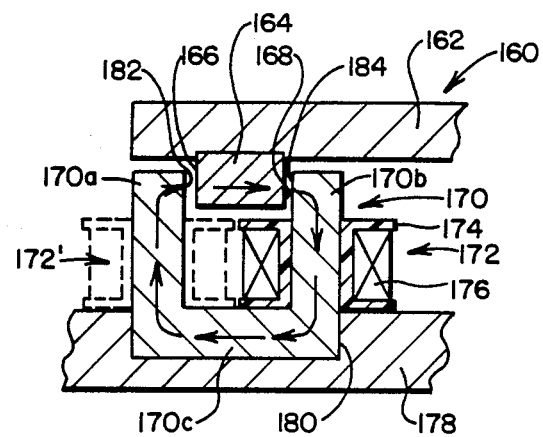
FIG. 10 is a partial sectional view of the permanent magnet and pole assembly arrangement for another embodiment of a motor according to the invention.

Referring to FIG. 10, another embodiment of the motor of the invention incorporating a singular arcuate permanent magnet is revealed in general at 160. The motor 160 is structured in similar fashion as motor 100 with the exception of the elimination of a centrally disposed core component as well as the noted utilization of a singular arcuately shaped magnet. In the figure, the rotor support portion corresponding with portion 112 in FIG. 7 is shown at 162 as supporting one segment of an arcuately-shaped permanent magnet 164. Magnet 164, as before, is magnetized in a radial sense with respect to the central axis of the motor (not shown) so as to provide oppositely disposed flux transfer surfaces 166 and 168. A pole assembly of a predetermined number thereof for the motor 160 is represented in general at 170 and is seen to include radially outwardly positioned core component 170a and radially inwardly positioned core component 170b, these core components being integrally joined with a base portion 170c. A field winding assembly is shown at 172 to include an electrically insulative bobbin 174 and wire winding 176. The pole assembly 170 may employ this field winding 172 in the orientation shown or, in addition to, as shown in phantom at 172' positioned upon radially outwardly disposed core component 170a. The assembly 170 may be formed in modular fashion as described in conjunction with FIG. 7 so as to be mountable upon a stator base portion 178 within an annular groove of rectangular cross-section shown at 180. With the arrangement shown, flux transfer surface 166 of permanent magnet 164 confronts corresponding flux interaction surface 182 of core component 170a and, similarly, flux transfer surface 168 confronts flux interaction surface 184 of core component 170b. Thus with the instant embodiment, two flux transfer gaps are developed as opposed to four such gaps as are seen to be developed in the earlier motor embodiments.

Since certain changes may be made in the above-described apparatus without departing from the scope of the invention herein involved, it is intended that all matter contained in the description thereof or shown in the accompanying drawings shall be interpreted as illustrative and not in a limiting sense.

We claim:

1. A d.c. motor comprising:
   means for providing a stator base having a given central axis;
   rotor means mounted upon said stator base for rotation about said central axis;
   a predetermined number of permanent magnet components located upon said rotor for movement therewith about a circular rotor locus, each being magnetized having a select polarization aligned radially with respect to said central axis and emanating magnetic flux from oppositely disposed substantially parallel flux transfer surfaces thereof;
   a plurality of pole assemblies located upon said stator base along a circular locus of pole positions, each pole assembly including first and second spaced, substantially parallel core components mutually associated in magnetic flux transfer communication, each extending from said base to include a flux interaction surface extending into adjacency with said permanent magnet rotor locus to derive oppositely disposed flux transfer gaps with said flux transfer surfaces upon movement of said flux transfer surfaces into adjacency therewith forming a complete, localized magnetic circuit including said first and second core components, and field winding means positioned intermediate said base and a said flux interaction surface and selectively excitable to effect driven rotation of said rotor means about said axis.

2. The d.c. motor of claim 1 in which said permanent magnet components are configured having dimensions and positions along said rotor locus selected to effect a reduction of static state attraction and repulsion induced detent torque characteristics between said permanent magnet components and said pole assemblies.

3. The d.c. motor of claim 1 in which said field winding means comprises:
   an electrically insulative bobbin slideably mounted over a select said core component; and
   field winding wire wound about said bobbin for deriving a predetermined ampere-turn value.

4. The d.c. motor of claim 1 in which said pole assembly first and second core components are formed together as discrete modules of magnetically permeable material, said modules having a generally U-shaped configuration including a base component extending between said first and second core components and fixed to said stator base at a predetermined radius from said given central axis.

5. The d.c. motor of claim 1 in which said permanent magnet components are of arcuate shape, extending outwardly from said rotor means for movement of said flux transfer surfaces into said flux transfer gap defining adjacency with said core component flux interaction surfaces.

6. The d.c. motor of claim 5 in which:
   said permanent magnet components are located upon said rotor means along a first said rotor locus at a first radius from said axis and along a second said rotor locus at a second radius from said axis less than said first radius and defining a gap therebetween; and
   said pole assemblies are configured having a third said core component located upon said stator base, spaced from and substantially parallel with said second component, mutually associated therewith in magnetic flux transfer communication and having a said flux interaction surface extending with a said flux interaction surface of said second core component into adjacency with said first rotor locus, said flux interaction surfaces of said first and second core components extending into adjacency with said second rotor locus and said first and second and second and third forming complete, localized magnetic circuits.

7. The d.c. motor of claim 6 in which said permanent magnet components are located with said first and second rotor locus in mutually paired adjacency and are magnetized having mutually repelling radially opposed polarities.

8. The d.c. motor of claim 7 in which said field winding means is positioned about said second core component.

9. The d.c. motor of claim 8 in which said field winding means comprises:
   an electrically insulative bobbin slideably mountable over a select said second core component; and
   field winding wire wound about said bobbin for deriving a predetermined ampere-turn value.

10. The d.c. motor of claim 7 in which said second core component is configured having about twice the flux saturation cross section as said first and third core components.

11. The d.c. motor of claim 7 in which said pole assembly first, second and third core components are formed together as discrete modules of magnetically permeable material, said modules having a generally W-shaped configuration including a base component extending along said first, second and third core components and fixed to said stator base at a predetermined radius from said given central axis.

12. A d.c. motor comprising:
    means for providing a stator base having a given central axis;
    rotor means mounted upon said stator base for rotation about said central axis;
    a predetermined number of permanent magnet components, each including an elongate pair of arcuate shaped permanent magnets extending from said rotor means and spaced apart to define an arcuate channel therebetween, said permanent magnets of each said component being magnetized to exhibit polarization aligned substantially radially with respect to said axis and to provide mutually inwardly facing flux transfer surfaces having a first polarity and radially oppositely disposed first and second flux transfer surfaces of second polarity opposite to said first polarity;

a plurality of pole assemblies located upon said stator base along a circular locus of pole positions, each said pole assembly having three substantially parallel and mutually spaced core components including a central core component magnetically associated in flux transfer communication with first and second adjacent core components, said central core component extending from said base to provide oppositely disposed flux interaction surfaces extensible within said arcuate channel to derive oppositely disposed first and second flux transfer gaps with said mutually inwardly facing flux transfer surfaces, said first and second core components extending from said base to provide respective first and second flux interaction surfaces extensible into adjacency with respective said first and second radially oppositely disposed flux transfer surfaces to derive respective third and fourth flux transfer gaps, and field winding means positioned intermediate said base and said flux interaction surfaces, and selectively excitable to effect driven rotation of said rotor means about said axis.

13. The d.c. motor of claim 12 in which said permanent magnet components are provided as arcuate segments having predetermined lengths, positions and polarizations selected to effect a reduction of static state attraction and repulsion induced detent torque characteristics between said permanent magnet components and said pole assemblies.

14. The d.c. motor of claim 12 in which said field winding means comprises:
an electrically insulative bobbin mountable over said central core component; and
field winding wire would about said bobbin for deriving a predetermined ampere-turn value.

15. The d.c. motor of claim 12 in which said central core component is configured having about twice the flux saturation cross-section as said first and second adjacent core components.

16. The d.c. motor of claim 12 in which said central core component is configured having a flux saturation cross section of extent for forming magnetic circuits with both said first and second adjacent core components.

17. The d.c. motor of claim 12 in which at least one said pole assembly central, first and second core components are formed together as discrete modules of magnetically permeable material, said module including a base component extending along said central, first and second core components and fixed to said stator base at a predetermined radius from said given central axis.

18. The d.c. motor of claim 17 in which said rotor means is formed of a low density non-magnetically permeable material.

19. The d.c.motor of claim 18 in which said stator base is formed of a non-magnetically permeable material.

20. The d.c. motor of claim 12 in which:
said predetermined number of permanent magnet components is six, two of which are configured as arcuate segments within an arc of about 60° extending from said central axis; and
nine said pole assemblies are located upon said stator base.

21. The d.c. motor of claim 12 in which four of said permanent magnet components are configured as arcuate segments each within an arc of about 40° extending from said control axis.

* * * * *